UNITED STATES PATENT OFFICE.

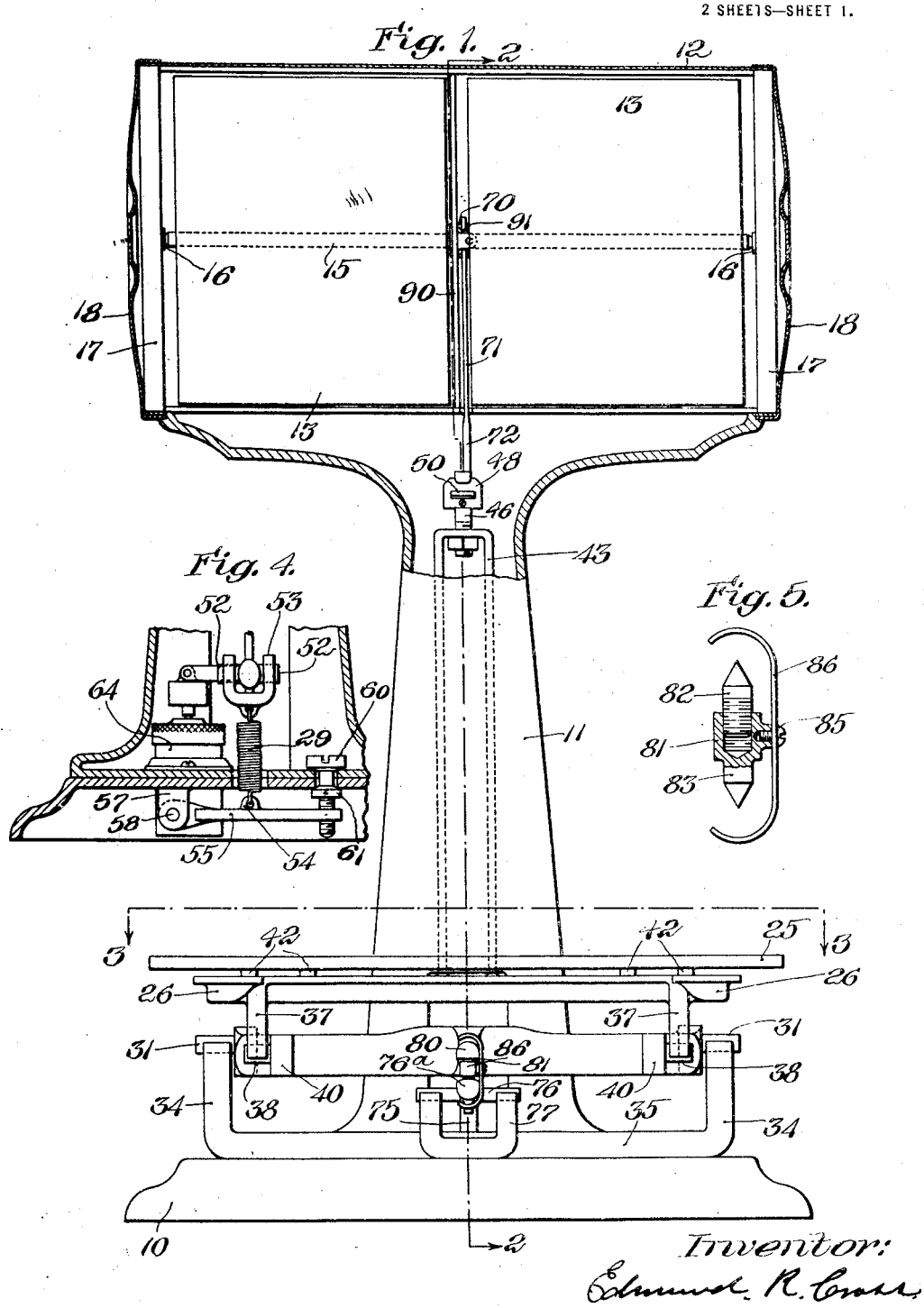

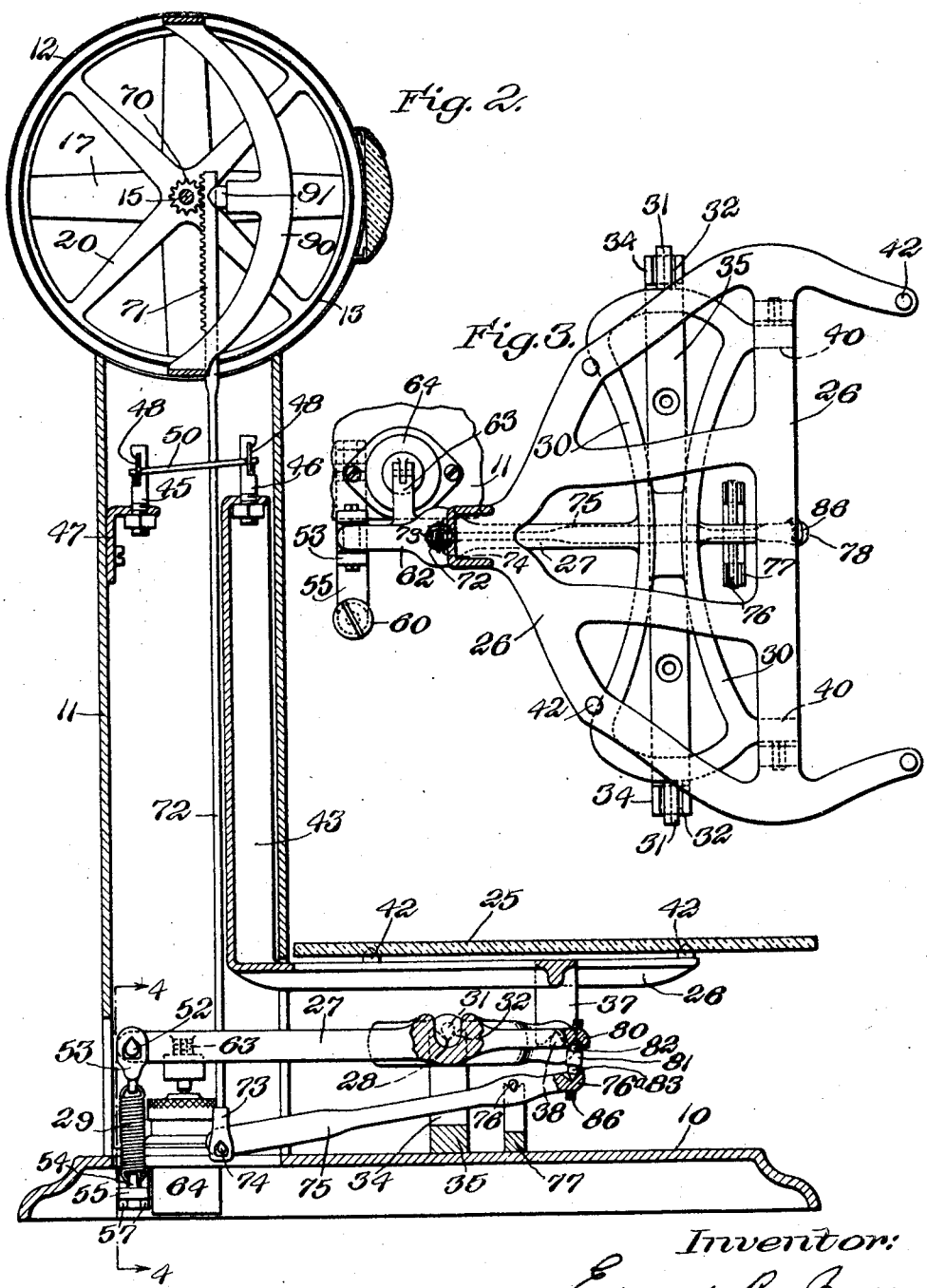

EDMUND R. CROSS, OF BOSTON, MASSACHUSETTS.

WEIGHING-SCALE.

1,355,942.   Specification of Letters Patent.   Patented Oct. 19, 1920.

Application filed December 26, 1916. Serial No. 138,723.

*To all whom it may concern:*

Be it known that I, EDMUND R. CROSS, a citizen of the United States, residing at Boston, in the county of Suffolk and State of Massachusetts, have invented a new and useful Improvement in Weighing-Scales, of which the following is a specification, reference being had therein to the accompanying drawings.

This invention relates to weighing scales and more especially to that type of automatic computing scale employing a cylindrical chart and commonly known as drum scale.

The main object of the invention is to provide a scale of simple construction and few parts which is sensitive and accurate in operation, which may be easily adjusted and which is of low cost of construction.

A further object is to provide a construction in which the friction is eliminated so far as possible by reducing the number of bearing points to a minimum.

Another object of the invention is to do away with the use of a counter-poise, and thereby, in addition to other advantages, to increase the life of the knife edges and bearings.

An additional object is to provide means whereby a substantial movement of the means for indicating weight may be attained while preserving a very limited range of movement of the scale-beam.

Other and additional objects of the invention will be more specifically set forth and described hereinafter.

In the accompanying drawings illustrating one application of my invention, Figure 1 is a front elevation of a cylindrical chart scale constructed and operated in accordance with my invention, the upper portion of the casing being broken away to show the interior construction; Fig. 2 is a central, vertical, sectional view of the same on line 2—2 in Fig. 1; Fig. 3 is a plan view looking downwardly on line 3—3 in Fig. 1; Fig. 4 is a detail elevation of the scale-beam spring and adjustable means for leveling the scale platform on line 4—4 in Fig. 2 looking from left to right; and Fig. 5 is an elevation, partly in section, on an enlarged scale of the two point bearing between the scale-beam and the rack-lever.

In the drawings showing my invention as applied to a cylinder computing scale commonly known as a "drum" scale, 10 designates the base of the scale, 11 a hollow column or post which carries a cylindrical casing 12 within which is mounted a cylindrical chart 13. The latter is mounted on a spindle 15, the ends of which are journaled in suitable bearings 16 carried by skeleton end brackets 17. The ends of the cylindrical casing 12 are covered by suitable caps 18 which are removable to permit access to the chart 13. The latter is generally made of paper rolled on a plurality of frames 20 secured to the spindle 15 at proper intervals, and after being rolled in position the chart is varnished. The chart may be marked with suitable graduations denoting weight and with figures representing money value. All of the foregoing construction is old and well known in the scale art.

The operative parts of the scale comprise a scale platform 25 supported on a spider 26, a scale-beam 27 fulcrumed at 28 and a spring 29 attached to the end of the long arm of the scale-beam. The scale-beam may be of any suitable form but as shown is substantially in the form of a cross, the cross arms 30 of the scale-beam being provided at the end with knife edges 31 resting in agate bearings 32 which are set in the upright ends 34 of a support 35 fastened on the base 10 of the scale. The spider 26 is provided with two depending projections 37 having bearings in their lower ends adapted to engage knife edges 38 set in forwardly projecting extensions 40 from the cross arms of the scale-beam. The two forward projections 40 constitute in effect the short arm of the scale-beam.

The spider 26 is further provided with a plurality of upwardly projecting points 42 arranged at proper intervals which engage corresponding holes in the platform 25 and thereby hold the same against lateral movement. In order to maintain the spider and platform at all times horizontal and level, the rear end of the spider is extended upwardly to form a check rod 43 which is U-shaped in cross-section to prevent bending and which is connected to the column or post 11 in any suitable manner. As shown, however, two posts 45 and 46 are provided, the former being mounted on a bracket 47 fastened to the post 11 and the latter being mounted on the top of the check rod 43. These posts each carry a knife edge bearing 48 and are connected by a strip 50. The posts 45 and 46 are threaded through their supports so that they may be adjusted.

The long arm of the scale-beam 27 is connected to the base 10 by the coil spring 29, (see Fig. 4.) The end of the scale-beam is provided with a laterally extending knife edge 52 on each side in order to support a yoke 53 having suitable agate bearings to engage the knife edges. The lower end of the yoke is connected to the upper end of the coil spring 29; the lower end of the coil spring being connected to a lug 54 on a bar 55 which is pivotally connected at 57 to a bracket 58 depending from the base 10 of the scale. Through the free end of the arm 55 is threaded an adjusting screw 60 set loosely in the base with its head exposed above the base and a nut 66 underneath the base to hold the screw against longitudinal movement. The head of the screw 60 is slotted in order to enable it to be turned by a screw driver in order to move the arm 55 upwardly and downwardly for the purpose of regulating the position of the scale-beam to the zero point. By providing the screw 60 with a fine thread a very fine adjustment can be made. The coil spring 29 serves as the resistance or load opposing element to the weight on the scale platform.

To the end of the beam at 62 is secured a laterally extending arm 63 operating a dash-pot 64 which may be of any suitable construction and is intended merely to reduce the vibration of the scale-beam and to bring it to rest without undue oscillation.

It will be noticed that one result of the foregoing construction is the attainment of great simplicity and the eradication of the heavy counterpoise which is generally a feature of this type of scale. By eliminating the counter-poise, I secure a light construction and avoid the heavy wear on the bearings due to its excessive weight. This greatly lengthens the life of the scale, especially the duration of the knife edge bearings and contributes both to efficiency and accuracy.

In order to operate the cylindrical chart and yet retain a short arc of movement for the scale-beam I provide the following means: The spindle has mounted upon and secured thereto at the center a pinion 70 and meshing with the pinion is a rack 71 mounted on a vertical rod 72 the lower end of which is provided with a yoke 73 containing suitable bearings and resting upon knife edges 74 set laterally in the end of a rack-lever 75, the latter being fulcrumed at 76 on suitable knife edge bearings on a support 77 arranged on the scale base. The short arm of the lever 75 has an upwardly turned cup-shaped bearing 79. The rack-lever 75 is so arranged that the end of its short arm is in close proximity to a forwardly extending arm 78 on the scale lever, and the latter is provided with a downwardly turned cup-shaped bearing 80. Between the arm 78 and the short arm of the rack-lever is interposed an adjustable two-point bearing 81 shown in detail in Fig. 5. This bearing is made up of a male member 82 screw-threaded into a female member 83, each being provided with a sharp bearing point to engage respectively the bearings 79 and 80. Mounted on the member 83 and secured thereto by a screw 85 is an open loop 86 one end of which incloses the arm 78 of the scale-beam and the other the short arm of the rack-lever so that the bearing 81 may not fall out from between its bearing points when there is any sudden movement of the scale-beam. The bearing 81 is made adjustable in order that the starting point or position of the rack-lever may be regulated with respect to the scale-beam. In order to keep the rack in mesh with the pinion against lateral displacement a rack-guard 90 may be provided having a point 91 to one side of the rack 71.

In the use of my scale the adjustment is first made of the check-rod by raising or lowering the posts so that the spider and the platform supported thereby are absolutely horizontal and level. The scale-beam is then adjusted at zero by adjusting the threaded screw 60 and the bar 55 and by adjusting the adjustable bearing 81. After this has been done any weight placed upon the scale pan causes the short arm of the scale to be depressed and the long arm to be raised in opposition to the tension of the spring 29, and as the short arm of the scale-beam is depressed it causes the short arm of the rack-lever through the medium of the bearing 81, to move downwardly and the rack-bar 72 and rack 71 to be moved upwardly thereby turning or rotating the chart to indicate the weight upon the scale platform. The adjustments to be made to secure these results will be apparent to anyone skilled in the scale art.

It will be observed that with the exception of the load opposing spring on the end of the scale-beam, I have eliminated the use of all other springs in construction of the scale and thereby reduce to a minimum variations which might otherwise be due to changes in temperature. Furthermore, the use of a spring as the load opposing element enables me to dispense with the use of the heavy counter-poise and thereby makes it possible to have a lighter construction of the operative parts of the scale. The use of the rack-lever construction as shown, permits of the movement of the indicating means being multiplied in relation to the movement of the scale-beam and I am thereby enabled to reduce the arc of movement of the scale-beam which increases the efficiency, sensitiveness and life of the scale. By reducing the distance of travel of the scale-beam, the knife edges are limited in their movement from side to side on the bearing, to a much smaller arm, which permits the agate bearing in which the knife edges set to be made more accurate, thereby preventing the wear of the knife edges from use and contribute to continued accuracy and life of the bearing.

All of these features contribute to render the scale more sensitive and to reduce the cost of construction.

It is to be understood that the foregoing description merely sets forth one application of my invention to a particular type of scale. My invention is applicable to various other types and may be embodied therein with slight modifications which will be apparent to anyone skilled in the scale art, and it is my desire to claim the invention broadly except where specifically limited in the following claims.

What I claim is:—

1. A scale comprising a scale-beam, means for indicating weight, means including a lever for operating said indicating means, and a two-point bearing intermediate said lever and said scale-beam for transmitting movement from said scale-beam to said lever to operate said indicating means; said bearing consisting of two members capable of relative adjustment one to the other.

2. A scale comprising a scale-beam, means for indicating weight, means including a lever for operating said indicating means and a two-point bearing intermediate said lever and said scale-beam for transmitting movement from said scale-beam to said lever to operate said indicating means; said bearing being composed of two pointed members, one screw-threaded into the other to permit of relative adjustment.

3. In a scale, the combination with a scale-beam and means for indicating weight of means for operating said indicating means, comprising a rack-bar and pinion, a lever having one end connected to said rack-bar and the other end arranged in close proximity to one end of said scale-beam, said lever being fulcrumed nearer its latter end, and an adjustable two-point bearing arranged between the adjacent ends of said scale-beam and said lever whereby any movement of said scale-beam actuates said lever to operate the weight indicating means.

4. A scale comprising a scale-beam, means for indicating weight, a lever for operating said indicating means and an adjustable two-point bearing interposed between said scale-beam and said lever whereby any movement of said scale-beam operates said indicating means through said lever.

5. A scale comprising a scale-beam, a spring weight resisting element, a drum chart for indicating weight, a pinion and rack-bar for rotating said chart, a lever pivotally mounted between its two ends, one of said ends being connected to said rack-bar and the other end lying in close proximity to the free end of said scale-beam and a compression bearing interposed between the adjacent ends of said scale-beam and said lever whereby any movement of said scale-beam actuates said lever to operate said drum chart; said bearing being composed of two pointed members capable of relative adjustment.

6. A scale comprising a scale-beam, a spring weight resisting element, a drum chart for indicating weight, a pinion and rack-bar for rotating said chart, a lever pivotally mounted between its two ends, one of said ends being connected to said rack-bar and the other end lying in close proximity to the free end of said scale-beam and a compression bearing member interposed between the adjacent ends of said scale-beam and said lever whereby any movement of said scale-beam actuates said lever to operate said drum chart.

7. A scale comprising a scale-beam, means for indicating weight, means including a lever for operating said indicating means and means intermediate said lever and said scale-beam whereby any movement of said scale-beam operates said indicating means through said lever; said intermediate means comprising a bearing made up of two members each having a bearing point and one being screw-threaded into the other to permit of longitudinal relative adjustment between the two and means for holding said bearing in intermediate position between said lever and said scale-beam.

8. The combination with a scale-beam pivoted off center, a weight indicator and operating means for the weight indicator, of a lever fulcrumed adjacent one end, the long arm of said lever being connected to said operating means, and means whereby any movement of the scale beam due to weight is communicated from the short arm of said scale-beam to the short arm of said lever to cause a relatively long movement of the operating means.

9. A scale comprising a scale-beam pivoted off center, a weight indicator, means for operating said weight indicator, a lever fulcrumed near one end thereof and having its long arm connected to said operating means, and means interposed between the short arm of said lever and the short arm of the scale-beam whereby any movement of said scale-beam produces a multiplied movement of said operating means through said lever.

10. A scale comprising a scale-beam pivoted off center, a weight indicator, means for operating said weight indicator, a lever fulcrumed near one end thereof and having its long arm connected to said operating means, and a two-point bearing interposed between the short arm of said lever and the short arm of the scale-beam whereby any movement of said scale-beam produces a multiplied movement of said operating means through said lever.

11. A scale comprising a scale-beam pivoted off center, a weight indicator, means for operating said weight indicator comprising a pinion and a rack-bar, a lever fulcrumed near one end thereof and having its long arm connected to said rack-bar and means interposed between the short arm of said lever and the short arm of said scale-beam whereby any movement of said scale-beam produces a multiplied movement of said rack-bar through said lever.

In witness whereof, I hereunto set my hand this twenty-first day of December, 1916.

EDMUND R. CROSS.